July 30, 1968     C. GOODACRE     3,394,770
INDUSTRIAL TRUCKS
Filed May 12, 1966
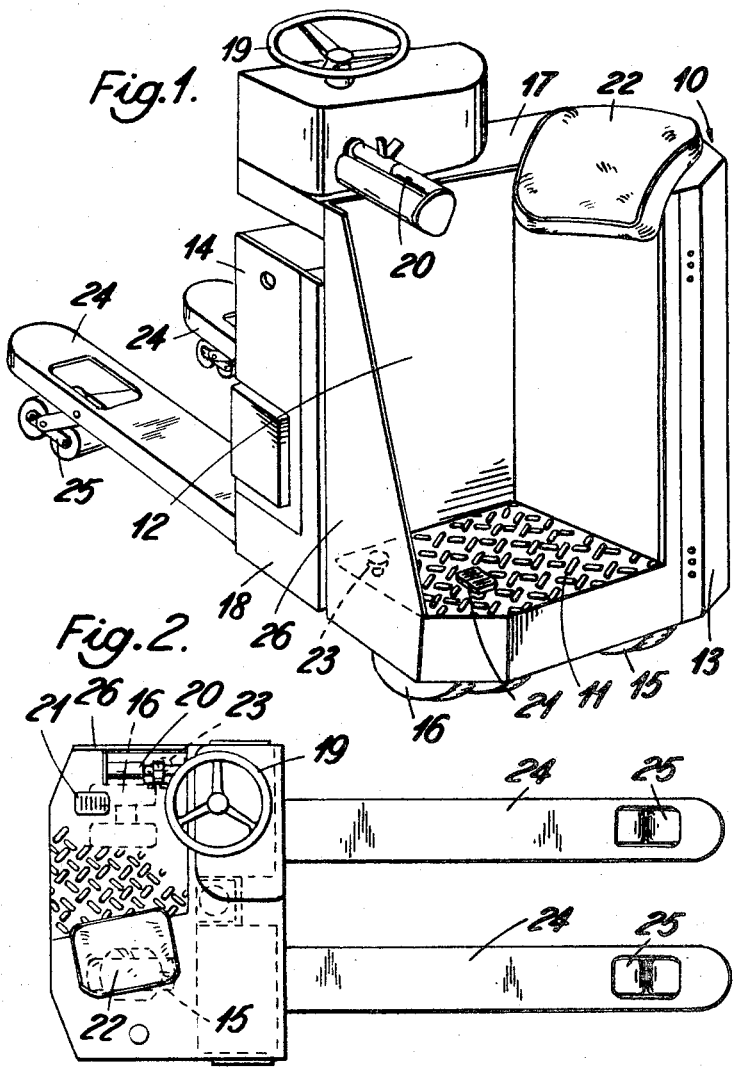

United States Patent Office 3,394,770
Patented July 30, 1968

3,394,770
INDUSTRIAL TRUCKS
Cecil Goodacre, Basingstoke, England, assignor to Lansing Bagnall Limited, Basingstoke, England, a British company
Filed May 12, 1966, Ser. No. 549,574
Claims priority, application Great Britain, May 14, 1965, 20,406/65
2 Claims. (Cl. 180—54)

ABSTRACT OF THE DISCLOSURE

An industrial truck is provided with a housing containing driving means for a ground wheel, an operator platform arranged in side-by-side relation with the housing across the width of the truck, a resting pad at least partially over the said housing at a height appropriate for an operator to rest against when standing on the platform and control means comprising a steering wheel which is supported forwardly of the platform and a speed and direction control unit designed for hand operation and projecting rearwardly of the steering wheel, the control means being accessible to an operator both when he is standing on the platform and when he is resting against the resting pad.

---

This invention relates to industrial trucks.

According to the invention an industrial truck comprises on one side of the truck an upright housing containing driving means for a ground wheel and on the other side of the truck an operator platform extending laterally from the said housing on which an operator can stand to drive the truck, a fork or load-platform structure extending forwardly of the said housing and the operator platform, and a resting or seat pad for the operator located at least partially over the aforesaid housing, which pad is designed for use by an operator having his body directed towards the said other side of the truck.

In one form of the invention the housing is of box-like shape and the said pad is a resting pad located partially on the top surface of the housing and partially on the vertical surface adjacent the operator platform.

Preferably, the truck includes operator control means for the driving means and for the ground wheel which control means are forward of the operator platform, in respect of the remainder of the truck, and/or adjacent the said other side of the truck, the said control means being supported on a part of the truck forward of the platform and positioned so that an operator can stand on the operator platform between the said housing and the control means, or behind the control means. In such a case, these operator control means may comprise a steering wheel positioned forwardly of the operator platform and designed to be held by the operator in one hand and a rearwardly projecting unit carrying speed and direction controls designed for operation by the operator's other hand.

A further feature of this invention is the parts of both the said other side of the truck and the back of the truck that are adjacent the operator platform may be open whereby an operator can step on to the platform from the said side or the back of the truck.

By way of example, a truck constructed in accordance with the invention will now be described with reference to the accompanying drawings in which:

FIGURE 1 is a perspective view of the truck; and
FIGURE 2 is a plan view of the truck.

With reference to the drawings, an industrial pallet truck is provided with a body portion 10 and a substantially square platform 11 at the rear of the body portion on which platform an operator can stand during movement of the truck.

The platform and the driving controls for the operator (as will be further described below) are designed for the operator to stand on the platform with his body directed towards the left-hand side of the truck. The platform is also open at its back to allow access thereto by the operator.

Alongside the platform, there is located a housing 13 for the drive unit of the truck, which unit comprises an electric motor powered by a battery 14 located on a battery support platform 18 extending transverse of the truck in front of the operator platform 11 and the drive unit housing 13. The battery support platform 18 is divided off from the operator platform 11 by a transverse dividing wall 12.

Directly underneath the drive unit housing 13 there is a ground wheel 15 which is driven through chain and sprocket gearing by the electric motor and which is steerable by means of a steering wheel 19 connected thereto. The steering wheel is located forward of the operator's platform 11 above a shelf 17 over the batteries 14 and is designed to be held by the operator's right-hand. Also, projecting rearwardly over the operator's platform, there is a control arm 20 carrying a butterfly-type speed control lever and lift and lower buttons. This arm 20 is designed to be operated by the operator's left hand.

The ground wheel 15 is also provided with a brake mechanism operated by a "dead-man" brake pedal 21 upstanding from the operator platform 11. The pedal 21 is normally depressed, by the operator's left foot, during operation of the truck but when released it is operative to cut-off the motor current and apply the brake mechanism of the ground wheel 15.

There is also provided a second ground wheel underneath the operator platform 11, which wheel, in this example, comprises a double castor wheel 16.

Forwardly projecting from the body portion of the truck there are two load-carrying forks 24, each fork being provided with a pair of trail wheels 25. These forks may, of course, be replaced by a solid platform in which case the truck would be a stillage truck.

The left-hand side of the platform is provided with a guard panel 26 but, if desired, this panel may be reduced to a minimum to allow access to the platform 11 from the side of the truck as well as from the back.

A horn-button 23, operable by the operator's right foot, is also provided.

On the right-hand side of the truck and above the drive unit housing 13, there is a resting pad 22 for the operator which pad is partly on the top surface and partly on the adjacent vertical surface of the drive unit housing 13, i.e. over the motor of the truck, whereby the operator may readily lean or rest against the pad and yet still control the truck and maintain pressure on the dead-man brake pedal 21. In this example, the height of the top surface of the drive unit housing 13 is 26" above the operator platform 11, which height may be compared with known forms of stand-on trucks of this type in which this height can be of the order of 38". This particular design thus has the advantage of increasing the all-round visibility for the operator.

It is to be appreciated that the steering wheel 19 and control unit could be designed for operation by the operator's left and right hands respectively, in which case the drive unit would be located on the left-hand side of the body portion of the truck and the operator platform would be located on the right-hand side of the truck. The operator would then drive the truck with his body directed towards the truck's right-hand side.

It is also to be appreciated that the provision of the resting pad over the drive unit allows for the width of the truck to be kept to a minimum.

It is further to be appreciated that this invention is not limited to any particular height from the operator platform for the resting pad 22. For example, it is possible that the height of the pad could be reduced by such an extent that it forms a seat for the operator. However, in such a case, the steering wheel 19 and the control unit 20 are still located such that the operator can drive the truck standing up and he will thus have the choice of either standing up or sitting down.

I claim:

1. An industrial truck comprising an upright housing containing driving means for a ground wheel, an operator platform extending laterally from the said housing on which an operator can stand to drive the truck, the housing and platform being arranged in side-by-side relation across the width of the truck, a load carrier extending forwardly of the said housing and the operator platform, a resting pad for the operator located at least partly over the said housing which pad is at a height appropriate for an operator to rest against when standing on the operator platform and which pad is directed transversely of the longitudinal axis of the truck, and control means for the said driving means and the ground wheel accessible to an operator standing on the operator platform which control means comprise a steering wheel supported forwardly of the operator platform and a unit comprising speed and direction controls designed for hand operation by an operator standing on the operator platform, which unit projects rearwardly of the steering wheel, the control means being accessible to an operator both when he is standing on the operator platform and when he is resting against the resting pad.

2. A truck as claimed in claim 1 in which the housing is of box-like shape and in which the said resting pad is located partially on the top surface of the housing and partially on the vertical surface adjacent the operator platform.

References Cited

UNITED STATES PATENTS

| | | | |
|---|---|---|---|
| 2,625,285 | 1/1953 | Weaver | 180—54 XR |
| 2,899,093 | 8/1959 | Morrell | 187—9 XR |
| 2,913,062 | 11/1959 | Ulinski | 180—65 XR |
| 3,014,344 | 12/1961 | Arnot | 187—9 XR |

BENJAMIN HERSH, *Primary Examiner.*

M. L. SMITH, *Assistant Examiner.*